United States Patent
Jung (10) Patent No.: US 12,098,023 B2
(45) Date of Patent: Sep. 24, 2024

(54) PORTABLE CARRIER BAG FOR DISPOSING PET WASTE

(71) Applicant: MORRIS&CO CO., LTD., Chungcheongbuk-do (KR)

(72) Inventor: Tae Bong Jung, Seoul (KR)

(73) Assignee: MORRIS & COCO., LTD., Chungcheongbuk-Do (KR)

( * ) Notice: Subject to any disclaimer, the term of this patent is extended or adjusted under 35 U.S.C. 154(b) by 0 days.

(21) Appl. No.: 17/868,958

(22) Filed: Jul. 20, 2022

(65) Prior Publication Data

US 2023/0064101 A1 Mar. 2, 2023

(30) Foreign Application Priority Data

Aug. 25, 2021 (KR) .................. 10-2021-0112506

(51) Int. Cl.
 *B65F 1/00* (2006.01)
 *A01K 27/00* (2006.01)
(52) U.S. Cl.
 CPC ............ *B65F 1/002* (2013.01); *A01K 27/008* (2013.01)
(58) Field of Classification Search
 CPC ........ B65F 1/002; B65F 1/0033; B65F 1/004; A01K 27/008
 See application file for complete search history.

(56) References Cited

U.S. PATENT DOCUMENTS

| | | | |
|---|---|---|---|
| 5,447,227 A | 9/1995 | Koseberg | |
| 10,646,026 B1* | 5/2020 | Clementi | A45F 5/021 |
| 2003/0111022 A1* | 6/2003 | Woolley | A01K 27/004 |
| | | | 119/868 |
| 2006/0219188 A1* | 10/2006 | Beaupre | A01K 27/006 |
| | | | 119/795 |
| 2006/0231043 A1* | 10/2006 | Galdo | A01K 27/006 |
| | | | 119/796 |
| 2009/0095225 A1* | 4/2009 | O'Connell | E01H 1/1206 |
| | | | 119/161 |
| 2016/0000198 A1* | 1/2016 | Labadini | A45F 4/02 |
| | | | 119/797 |

(Continued)

FOREIGN PATENT DOCUMENTS

| | | |
|---|---|---|
| DE | 20 2005 010 190 U1 | 10/2005 |
| JP | 2000-316407 A | 11/2000 |

(Continued)

*Primary Examiner* — Derek J Battisti
(74) *Attorney, Agent, or Firm* — LRK PATENT LAW FIRM (57) ABSTRACT

Proposed is a portable carrier bag for disposing pet waste in which a tissue storage space portion storing tissues or wet tissues and a pet waste storage space portion storing pet waste are separated from each other, an opening and closing member to open and close the tissue storage space portion is formed of a magnet, a fastener is installed along both lateral surfaces and a lower surface of the pet waste storage space portion, openings are formed on the rear surface of the pet waste storage space portion, a loop for connection with a pet leash is formed in the center of the top surface of the pet waste storage space portion or loops for connection with a shoulder strap are formed on the upper parts of both lateral surfaces thereof, and the portable carrier bag is made of a synthetic resin material.

7 Claims, 7 Drawing Sheets

(56) References Cited

U.S. PATENT DOCUMENTS

| | | | | |
|---|---|---|---|---|
| 2016/0135432 A1* | 5/2016 | Cox | ..................... | A01K 27/008 |
| | | | | 119/795 |
| 2021/0195872 A1* | 7/2021 | Kovarik | ............. | A41D 19/0024 |
| 2021/0289753 A1* | 9/2021 | Bradford | .............. | A01K 27/006 |
| 2022/0248631 A1* | 8/2022 | You | ..................... | A01K 27/008 |

FOREIGN PATENT DOCUMENTS

| | | | |
|---|---|---|---|
| KR | 10-2009-0046624 | A | 5/2009 |
| KR | 10-2016-0009082 | A | 1/2016 |
| KR | 10-2021-0033830 | A | 3/2021 |
| KR | 10-2254825 | B1 | 5/2021 |
| WO | 2020/124126 | A1 | 6/2020 |

\* cited by examiner

PORTABLE CARRIER BAG FOR DISPOSING PET WASTE

CROSS-REFERENCE TO RELATED APPLICATION

The present application claims priority to Korean Patent Application No. 10-2021-0112506, filed Aug. 25, 2021, the entire content of which is incorporated herein for all purposes by this reference.

BACKGROUND OF THE INVENTION

1. Field of the Invention

The present disclosure relates to a portable carrier bag for disposing pet waste. More particularly, the present disclosure relates to a portable carrier bag for disposing pet waste in which a tissue storage space portion storing tissues or wet tissues and a pet waste storage space portion storing pet waste which is picked up are separated from each other, thereby being capable of effectively storing tissues or wet tissues for disposing pet waste and the pet waste and making it easy to carry them; an opening and closing member to open and close the tissue storage space portion is formed of a magnet, thereby making it easy to open and close the tissue storage space portion; a fastener to facilitate opening and closing of the pet waste storage space portion is installed on both lateral surfaces and a lower surface of the pet waste storage space portion, and the pet waste storage space portion is opened toward the ground when the fastener is opened, thereby relieving displeasure when the pet waste is disposed, producing no risk of germ infection, and increasing cleanness when a pet owner goes out with a pet; a plurality of openings are formed on the rear surface of the pet waste storage space portion, thereby being capable of preventing permeation of smell into the portable carrier bag; a loop for connection with a pet leash is formed in the center of the top surface of the pet waste storage space portion, or a plurality of loops for connection with a shoulder strap are formed on the upper parts of both lateral surfaces of the pet waste storage space portion so as to allow the pet owner to hang the portable carrier bag over his/her shoulder by use of a strap, thereby enabling the pet owner to hang the portable carrier bag over his/her shoulder with holding the pet leash by one hand during walking with the pet, which also allows the pet owner to enjoy the work conveniently; and a material of the portable carrier bag is a hard synthetic resin material, thereby allowing the portable carrier bag to be used even in rainy or snowy weather and also making it easy to clean.

2. Description of Related Art

Currently, breeding pets such as dogs or cats have become very trendy, and in this regard, walking with pets has increased gradually. This increase in outdoor activities of the pets also causes increase in pet waste outside.

Where a pet excretes outside, disposal of the excretion has become obligatory in terms of moral and legal aspects. In this regard, a pet owner who accompanies a pet is in need of carrying multiple tools to dispose the excretion during the outdoor activity of the pet. The pet owner needs to have at least a garbage bag to input the excretion therein.

As described above, upon taking a pet out of the house, the pet owner should carry waste pickup bags for picking up the pet's waste and wet tissues for cleaning the pet's feet or anus. The wet tissue is to remove excrement around the pet's anus or to clean the pet's dirty feet before entering into the house or taking the pet indoor, and the waste pickup bag is to collect excrement if the pet excretes outside.

Generally, the waste pickup bag and the wet tissue are kept separately in a bag or a garment. Accordingly, when the pet excretes outside, a waste pickup bag should be taken out of the bag or garment accommodating waste pickup bags therein, in order to handle the excrement.

In addition, when carrying a pet outside the house, a collar is generally hung on the pet's neck, and the collar is connected to a pet leash. In this regard, the pet owner has to handle the pet's excrement by use of only one hand which is free of holding the pet leash, in a state of holding the pet leash with another hand, thereby causing a great inconvenience in handling the excrement.

Another problem is caused even in a case the excrement is handled and collected because there is no proper place to store the collected excrement.

Further, even when the pet is moved into the car or indoor, the pet owner should conduct cleaning the pet by using one hand to take out the wet tissue in a state of holding the pet with another hand, thereby producing a great inconvenience.

In order to solve the above problems, a pet excrement handling bag in which a waste pickup bag to pick up the excrement and a waste bag storing the picked-up excrement are separately kept was proposed. However, such a conventional pet excrement handling bag is formed with an inner space storing an assembly of garbage bags being separable one by one along the perforated line thereof, which are continuously rolled in a roll type.

Accordingly, the user has to take out the bags one by one from the inner space of the pet excrement handling bag, for use.

However, as each waste bag has to be cut along the perforated line thereof when taking out the bag from the conventional pet excrement handling bag, both of the two hands of the user are to be used. In addition, as the positions of the hands are to be changed, this makes the operation to take out the bag very troublesome.

That is, in order to separate the waste bag one by one, the user pulls up the tip end of a waste bag exposed outside from the bag by one hand in a state of holding the pet excrement handling bag with another hand, so as to have the perforated line portion exposed outside, then changes the positions of the hand holding the pet excrement handling bag, holds the lower end of the perforated line of the waste bag together with the pet excrement handling bag body, and strongly pulls up the tip end of the waste bag with another hand to thereby separate each waste bag from the assembly.

This condition would make the user more uneasy when he/she is holding the pet leash. As the case may be, the user may lose the pet leash.

Under the circumstances, development of a technology to easily separate each bag along the perforated line thereof when taking out the bag from the pet excrement handling bag is required.

In an effort to solve the above problems, there is an urgent need of developing a technology relating to a portable carrier bag for disposing pet waste in which a tissue storage space portion storing tissues or wet tissues and a pet waste storage space portion storing pet waste which is picked up are separated from each other, thereby being capable of effectively storing tissues or wet tissues for disposing pet waste and the pet waste and making it easy to carry them; an opening and closing member to open and close the tissue storage space portion is formed of a magnet, thereby making it easy to open and close the tissue storage space portion; a fastener to facilitate opening and closing of the pet waste storage space portion is installed on both lateral surfaces and a lower surface of the pet waste storage space portion, and the pet waste storage space portion is opened toward the ground when the fastener is opened, thereby relieving displeasure when the pet waste is disposed, producing no risk of germ infection, and increasing cleanness when a pet owner goes out with a pet; a plurality of openings are formed on the rear portion of the pet waste storage space portion, thereby being capable of preventing permeation of smell into the portable carrier bag; and a loop for connection with a pet leash is formed in the center of the top surface of the pet waste storage space portion, or a plurality of loops for connection with a shoulder strap are formed on the upper parts of both lateral surfaces of the pet waste storage space portion so as to allow the pet owner to hang the portable carrier bag over his/her shoulder by use of a strap, thereby enabling the pet owner to hang the portable carrier bag over his/her shoulder with holding the pet leash by one hand during walking with the pet, which also allows the pet owner to enjoy the work conveniently.

DOCUMENTS OF RELATED ART

Patent Documents (Patent Document 1) Korean Patent Application Publication No. 10-2009-0046624 (published on May 11, 2009)

SUMMARY OF THE INVENTION

Accordingly, the present disclosure has been made keeping in mind the above problems occurring in the related art, and an objective of the present disclosure is to provide a portable carrier bag for disposing pet waste in which a tissue storage space portion storing tissues or wet tissues and a pet waste storage space portion storing pet waste which is picked up are separated from each other, thereby being capable of effectively storing tissues or wet tissues for disposing pet waste and the pet waste and making it easy to carry them.

Another objective of the present disclosure is to provide a portable carrier bag for disposing pet waste in which an opening and closing member to open and close the tissue storage space portion is formed of a magnet, thereby making it easy to open and close the tissue storage space portion.

A further another objective of the present disclosure is to provide a portable carrier bag for disposing pet waste in which a fastener to facilitate opening and closing of the pet waste storage space portion is installed on both lateral surfaces and a lower surface of the pet waste storage space portion, and the pet waste storage space portion is opened toward the ground when the fastener is opened, thereby relieving displeasure when the pet waste is disposed, producing no risk of germ infection, and increasing cleanness when a pet owner goes out with a pet.

A still further another objective of the present disclosure is to provide a portable carrier bag for disposing pet waste in which a plurality of openings are formed on the rear surface of the pet waste storage space portion, thereby being capable of preventing permeation of smell into the portable carrier bag.

A still further another objective of the present disclosure is to provide a portable carrier bag for disposing pet waste in which a loop for connection with a pet leash is formed in the center of the top surface of the pet waste storage space portion, or a plurality of loops for connection with a shoulder strap are formed on the upper parts of both lateral surfaces of the pet waste storage space portion so as to allow the pet owner to hang the portable carrier bag over his/her shoulder by use of a strap, thereby enabling the pet owner to hang the portable carrier bag over his/her shoulder with holding the pet leash by one hand during walking with the pet, which also allows the pet owner to enjoy the work conveniently.

A still further another objective of the present disclosure is to provide a portable carrier bag for disposing pet waste in which a material of the portable carrier bag is a hard synthetic resin material, thereby allowing the portable carrier bag to be used even in rainy or snowy weather and also making it easy to clean.

In order to achieve the objectives of the present disclosure, there is provided a portable carrier bag for disposing pet waste according to an exemplary embodiment thereof, which may include a pet waste storage space portion in which a fastener is installed along both lateral surfaces and a lower surface thereof to facilitate opening and closing, the pet waste storage space portion being configured to be opened toward the ground when the fastener is opened, and to dispose and store pet waste therein; a tissue storage space portion formed in front of the pet waste storage space portion as a separate space, the tissue storage space portion being configured to have an opening and closing member, and to store tissues or wet tissues therein; and a loop formed in the center of the top surface of the pet waste storage space portion, for connection with a pet leash. The portable carrier bag may further include a plurality of loops for connection with a shoulder strap on upper parts of both lateral surfaces of the pet waste storage space portion, which are configured to allow a pet owner to hang the portable carrier bag over his/her shoulder by use of a strap.

The portable carrier bag may include a plurality of openings formed on the rear surface of the pet waste storage space portion, thereby being capable of preventing permeation of smell into the portable carrier bag.

The portable carrier bag may further include a cover configured to cover the tissue storage space portion, and the opening and closing member is mounted between the tissue storage space portion and the cover, being characterized in that the opening and closing member is any one of a combination of a button receiving portion and a button, a combination of female and male Velcro tapes, a combination of a hook and a loop, and a magnet.

The portable carrier bag may be characterized in that a material of the portable carrier bag is a hard synthetic resin, so as to allow for use of the portable carrier bag in rainy or snowy weather and also make it easy to clean the portable carrier bag.

The portable carrier bag may be characterized in that the tissue storage space portion, the cover thereof, the loop for connection with a pet leash, and the loop for a shoulder strap may be respectively sewn and fixed to the pet waste storage space portion.

The portable carrier bag may be characterized in that the loop for connection with the pet leash is formed by using any one of a combination of a button accommodating portion and a button, a combination of female and male Velcro tapes, a combination of a hook and a loop, and a magnet.

The portable carrier bag may be characterized in that the loop for connection with the pet leash and the loop for connection with the shoulder strap are used respectively through connection with a strap The portable carrier bag for disposing pet waste according to the present disclosure is advantageous in the following aspects.

First, a tissue storage space portion storing tissues or wet tissues and a pet waste storage space portion storing pet waste which is picked up are separated from each other, thereby being capable of effectively storing tissues or wet tissues for disposing pet waste and the pet waste and making it easy to carry them.

Second, an opening and closing member to open and close the tissue storage space portion is formed of a magnet, thereby making it easy to open and close the tissue storage space portion.

Third, a fastener to facilitate opening and closing of the pet waste storage space portion is installed on both lateral surfaces and a lower surface of the pet waste storage space portion, and the pet waste storage space portion is opened toward the ground when the fastener is opened, thereby relieving displeasure when the pet waste is disposed, producing no risk of germ infection, and increasing cleanness when a pet owner goes out with a pet.

Fourth, a plurality of openings are formed on the rear surface of the pet waste storage space portion, thereby being capable of preventing permeation of smell into the portable carrier bag.

Fifth, a loop for connection with a pet leash is formed in the center of the top surface of the pet waste storage space portion, or a plurality of loops for connection with a shoulder strap are formed on the upper parts of both lateral surfaces of the pet waste storage space portion so as to allow the pet owner to hang the portable carrier bag over his/her shoulder by use of a strap, thereby enabling the pet owner to hang the portable carrier bag over his/her shoulder with holding the pet leash by one hand during walking with the pet, which also allows the pet owner to enjoy the work conveniently.

Sixth, a material of the portable carrier bag is a hard synthetic resin material, thereby allowing the portable carrier bag to be used even in rainy or snowy weather and also making it easy to clean.

BRIEF DESCRIPTION OF THE DRAWINGS

The above and other objectives, features, and other advantages of the present disclosure will be more clearly understood from the following detailed description when taken in conjoint with the accompanying drawings, in which.

DETAILED DESCRIPTION OF THE INVENTION

Exemplary embodiments of the present disclosure will be described with reference to the accompanying drawings. In describing the present disclosure, the detailed descriptions of known art or component which is related to the present disclosure will be omitted when it may make the subject matter of the present disclosure unclear unnecessarily. Further, technical terms, as will be mentioned hereinafter, are terms defined in consideration of their function in the present disclosure, which may vary according to the intention of users or operators, practice, or the like. Accordingly, the definitions of the terms will be given based on the content to describe the portable carrier bag for disposing pet waste throughout the specification.

Hereinafter, the portable carrier bag for disposing pet waste in accordance with exemplary embodiments of the present disclosure will be described in detail with reference to the accompanying drawings.

Figure 1:
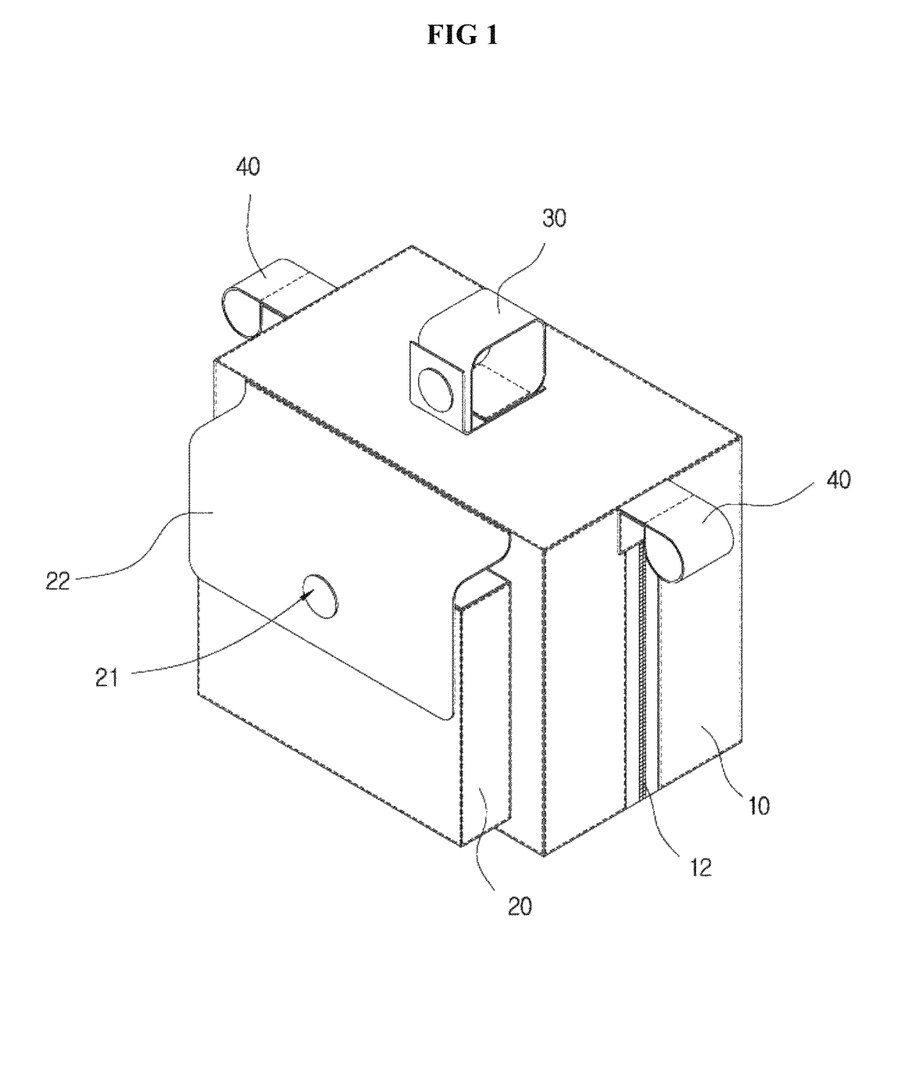
FIG. 1 is a perspective view of a portable carrier bag for disposing pet waste in accordance with an exemplary embodiment of the present disclosure.
Figure 2:
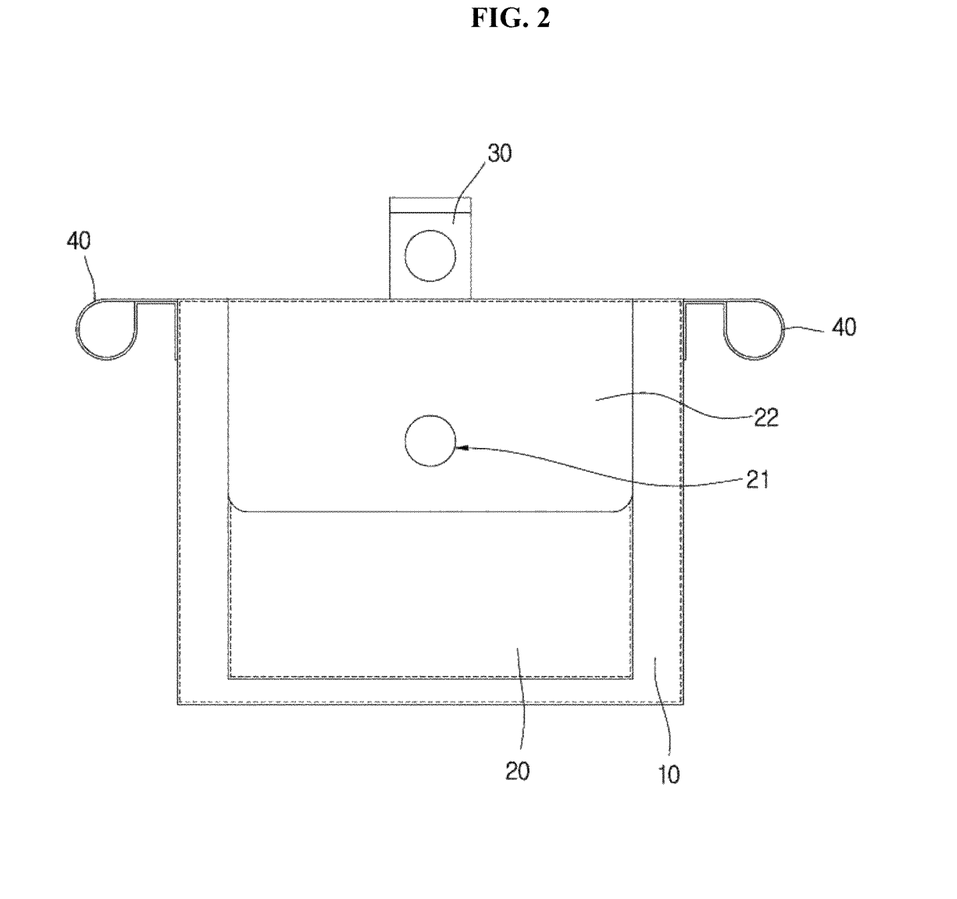
FIG. 2 is a front elevational view of the portable carrier bag for disposing pet waste in accordance with an exemplary embodiment of the present disclosure.
Figure 3:
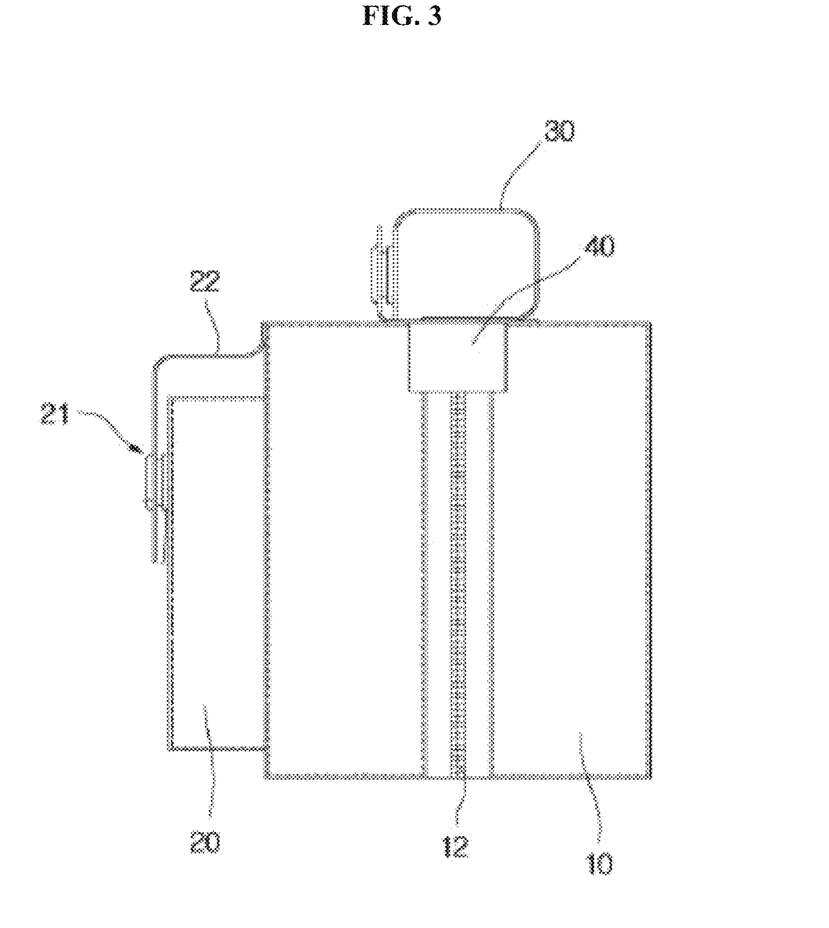
FIG. 3 is a side elevational view of the portable carrier bag for disposing pet waste in accordance with an exemplary embodiment of the present disclosure.
Figure 4:
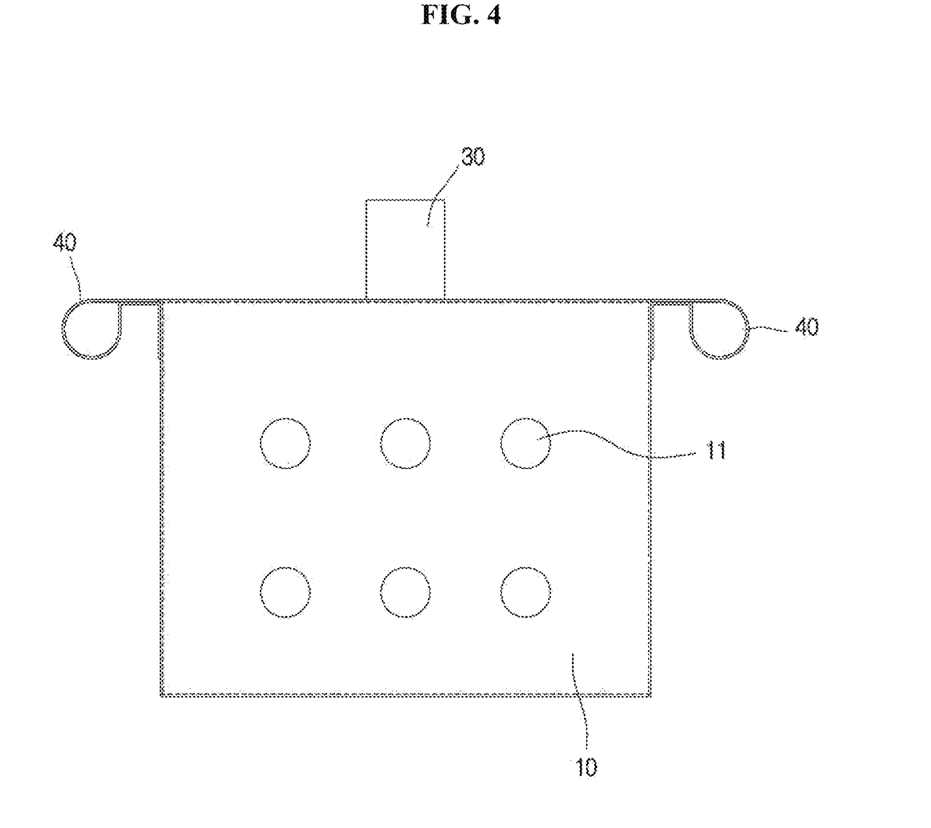
FIG. 4 is a rear elevational view the portable carrier bag for disposing pet waste in accordance with an exemplary embodiment of the present disclosure.
Figure 5:
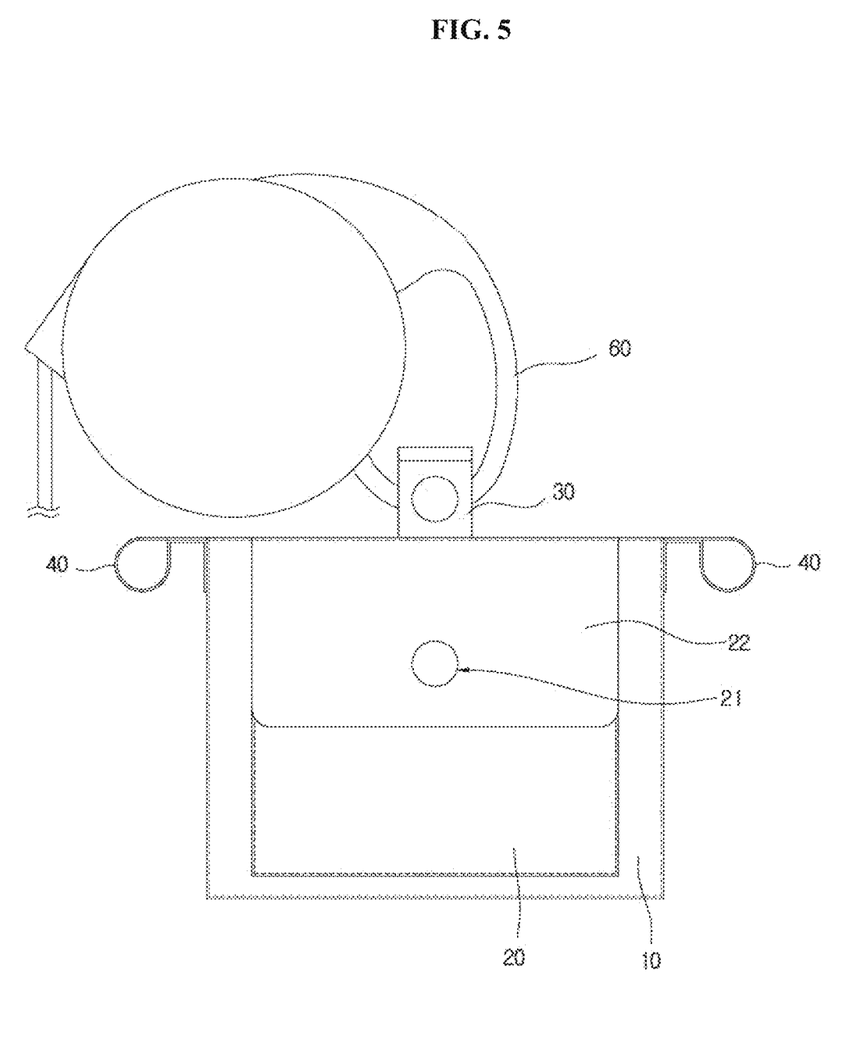
FIG. 5 is a view illustrating a configuration of the portable carrier bag for disposing pet waste in accordance with an exemplary embodiment of the present disclosure, in which a strap is connected with a loop of for connection with a pet leash.
Figure 6:
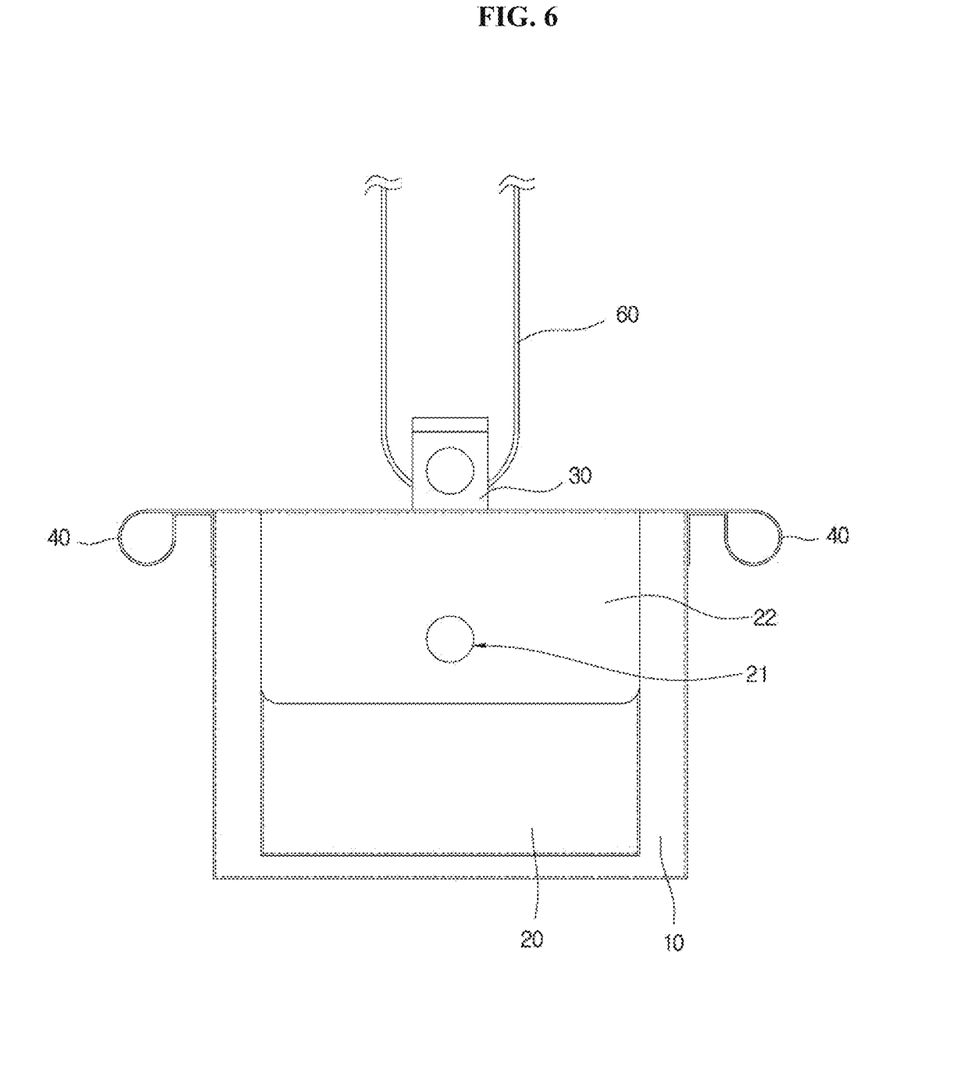
FIG. 6 is a view illustrating a configuration of the portable carrier bag for disposing pet waste in accordance with an exemplary embodiment of the present disclosure, in which a strap is connected with a loop of for connection with a pet leash in a different form.
Figure 7:
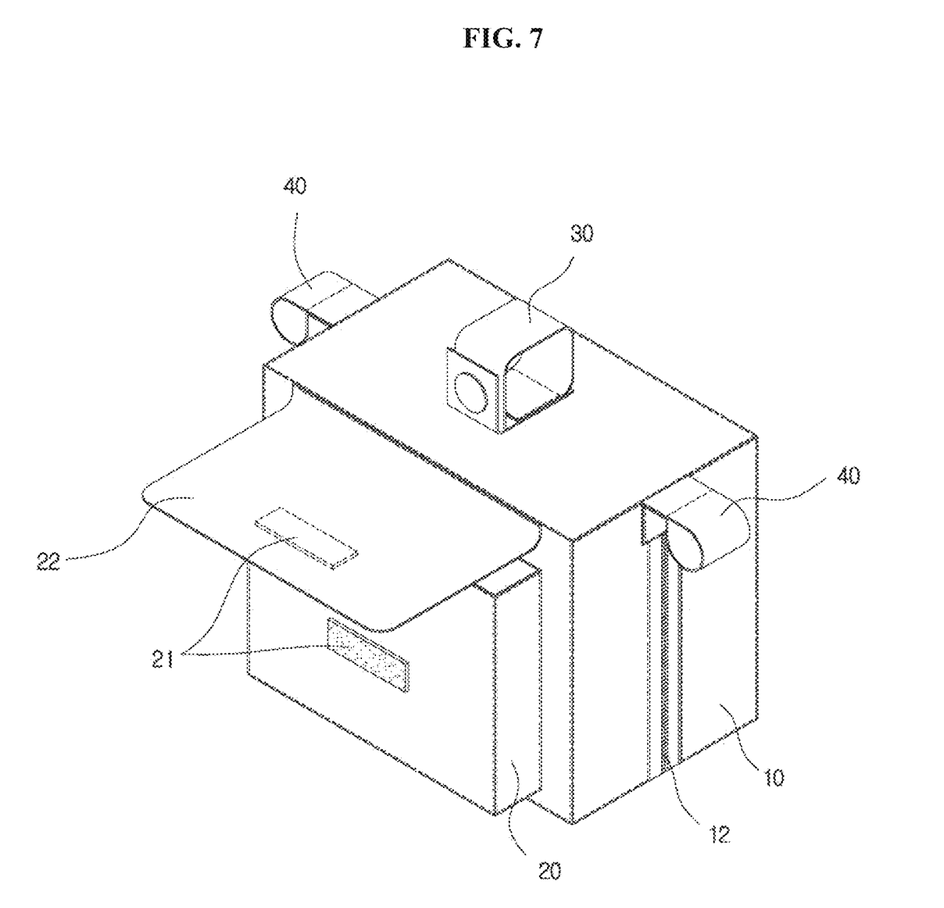
FIG. 7 is a view illustrating a configuration of the portable carrier bag for disposing pet waste in accordance with an exemplary embodiment of the present disclosure, in which an opening and closing member of a tissue storage space portion is formed of a female/male Velcro tape.

FIG. 1 is a perspective view of a portable carrier bag for disposing pet waste in accordance with an exemplary embodiment of the present disclosure; FIG. 2 is a front elevational view of the portable carrier bag for disposing pet waste in accordance with an exemplary embodiment of the present disclosure; FIG. 3 is a side elevational view of the portable carrier bag for disposing pet waste in accordance with an exemplary embodiment of the present disclosure; FIG. 4 is a rear elevational view the portable carrier bag for disposing pet waste in accordance with an exemplary embodiment of the present disclosure; FIG. 5 is a view illustrating a configuration of the portable carrier bag for disposing pet waste in accordance with an exemplary embodiment of the present disclosure, in which a strap is connected with a loop of for connection with a pet leash; FIG. 6 is a view illustrating a configuration of the portable carrier bag for disposing pet waste in accordance with an exemplary embodiment of the present disclosure, in which a strap is connected with a loop of for connection with a pet leash in a different form; and FIG. 7 is a view illustrating a configuration of the portable carrier bag for disposing pet waste in accordance with an exemplary embodiment of the present disclosure, in which an opening and closing member of a tissue storage space portion is formed of a female/male Velcro tape.

The portable carrier bag for disposing pet waste of the present disclosure as described above may include a pet waste storage space portion 10, an opening 11, a fastener 12, a tissue storage space portion 20, an opening and closing member 21, a cover 22, a loop 30 for connection with a pet leash, a loop 40 for connection with a shoulder strap, and a strap 60.

Referring to FIGS. 1 to 7, the portable carrier bag for disposing pet waste according to the present disclosure may include: a pet waste storage space portion 10 having a fastener 12 installed along both lateral surfaces and a lower surface thereof to facilitate opening and closing, the pet waste storage space portion 10 being configured to be opened toward the ground when the fastener 12 is opened, and to dispose and store pet waste therein; a tissue storage space portion 20 formed in front of the pet waste storage space portion 10 as a separate space, the tissue storage space portion being configured to have an opening and closing member 21, and to store tissues or wet tissues therein; and a loop 30 formed in the center of the top surface of the pet waste storage space portion 10, for connection with a pet leash. In addition, the portable carrier bag may further include a plurality of loops 40 for connection with a shoulder strap, being formed on the upper parts of both lateral surfaces of the pet waste storage space portion 10 so as to allow a pet owner to hang the portable carrier bag over his/her shoulder by use of a strap. The portable carrier bag may further include a plurality of openings 11 on the rear surface of the pet waste storage space portion 10, so as to prevent permeation of small into the portable carrier bag.

Technical means constituting the portable carrier bag for disposing pet waste according to the present disclosure would have the following functions.

In order to facilitate opening and closing of the pet waste storage space portion 10, a fastener 12 is installed along both lateral surfaces and the lower surface of the pet waste storage space portion 10 which is opened toward the ground when the fastener 12 is opened, so that pet waste picked up by use of a tissue can be stored therein.

That is, as the fastener 12 is formed in an elongated manner along both lateral surfaces and the lower surface of the pet waste storage space portion 10, it is possible to drop the pet waste into the toilet without touching the pet waste by opening the fastener 12. In other words, the pet waste can be easily disposed by opening the fastener in a state of holding the pet leash connected with the loop 30 for connection with the pet leash. In addition, as the fastener 12 is placed on the lower surface and both lateral surfaces of the portable carrier bag, the possibility that rainwater may flow in the portable carrier bag during rainy weather is greatly reduced. Further, as the fastener 12 is placed on the lower surface and both lateral surfaces of the portable carrier bag, the fastener 12 does not interrupt the loop 30 for connection with the pet leash, being installed on the top surface of the portable carrier bag. That is, compared with the conventional art in which a fastener is installed on the top surface of the portable carrier bag, it is very easy to install the loop 30 for connection with a pet leash according to the present disclosure.

The portable carrier bag for disposing pet waste of the present disclosure may include a plurality of openings 11 on the rear surface of the pet waste storage space portion 10, to prevent permeation of the smell into the portable carrier bag.

The tissue storage space portion 20 is separated from the pet waste storage space portion 10 as a separate space. An opening and closing member 21 to open and close the tissue storage space portion 20 is provided, and tissues or wet tissues may be stored in the tissue storage space portion 20. As the opening and closing member 21 is made of a magnet, it is easy to open and close the tissue storage space portion 20.

The tissue storage space portion 20 may further include a cover 22 on the upper part thereof, and the opening and closing member 21 may be installed between the tissue storage space portion 20 and the cover 22. The tissue storage space portion 20 may be any one selected from a combination of a button receiving portion and a button, a female/male Velcro tape, a combination of a hook and a loop, and a combination of magnets.

The loop 30 for connection with a pet leash may be formed in the center of the top surface of the pet waste storage space portion 10.

The loop 30 for connection with a pet leash may also be formed by use of any one of a combination of a button receiving portion and a button, a female/male Velcro tape, a combination of a hook and a loop, and a combination of magnets.

The loop 40 for connection with a shoulder strap may be in plural and formed on the upper parts of both lateral surfaces of the pet waste storage space portion 10 to allow a pet owner to hang the portable carrier bag over his/her shoulder by use of a strap.

In addition, the loop 30 for connection with a pet leash and the loop 40 for connection with a shoulder strap may be respectively used by means of connection with the strap 60.

Further, the tissue storage space portion 20, the cover 22, the loop 30 for connection with a pet leash, and the loop 40 for connection with a shoulder strap may be respectively sawn and fixed to the pet waste storage space portion 10.

As the material of the portable carrier bag as described above, the hard synthetic resin may be the most preferred material as this material allows for use of the portable carrier bag in rainy or snowy weather and also makes it easy to clean the portable carrier bag with water. However, any and all materials that may be generally used for bags may be used.

As the portable carrier bag for disposing pet waste of the present disclosure as described above is applicable for storing pet waste and tissues therein, the application scope thereof is extensive.

As described above, those of ordinary knowledge in the art to which the present disclosure pertains will appreciate that various substitutions, modifications, and alterations are possible, without departing from the technical spirit of the present disclosure, and thus, the patent right of the present disclosure is not limited to the exemplary embodiments described above and the accompanying claims.

What is claimed is:

1. A portable carrier bag for disposing pet waste, the portable carrier bag comprising:
    a substantially flat top surface, a substantially flat bottom surface, a front side surface, a back side surface a first lateral side surface and a second lateral side surface;
    a pet waste storage space portion in which a fastener is installed along a majority of a centerline of the first lateral surface, all of a centerline of the bottom surface and a majority of a centerline of the second lateral side surface to facilitate opening and closing, the pet waste storage space portion being configured to be opened toward the ground when the fastener is opened, and to dispose and store pet waste therein, wherein a plurality of openings are provided in the back surface of the pet waste storage space to allow air ventilation of the pet waste storage space;
    a tissue storage space portion formed in the front surface of the pet waste storage space portion as a separate space, the tissue storage space portion being configured to have an opening and closing member, and to store tissues or wet tissues therein; and
    a loop strap connected to the center of the substantially flat top surface of the pet waste storage space portion, for connection with a pet leash, wherein a handle of the pet leash is secured to the portable carrier bag by opening the loop to receive the handle and then closing the loop around the handle so as to secure the handle inside the loop.

2. The portable carrier bag of claim 1, further comprising a cover configured to cover the tissue storage space portion, wherein the opening and closing member is mounted between the tissue storage space portion and the cover and is any one of a combination of a button receiving portion and a button, a combination of female and male Velcro tapes, a combination of a hook and a loop, and a combination of magnets.

3. The portable carrier bag of claim 1, further comprising a plurality of loops for connection with a shoulder strap on upper parts of both lateral side surfaces of the pet waste storage space portion, which are configured to allow a pet owner to hang the portable carrier bag over his/her shoulder by use of a strap.

4. The portable carrier bag of claim 1, wherein a material of the portable carrier bag is a hard synthetic resin, so as to allow for use of the portable carrier bag in rainy or snowy weather and also make it easy to clean the portable carrier bag.

5. The portable carrier bag of claim 2, wherein the tissue storage space portion and the cover thereof are respectively sewn and fixed to the pet waste storage space portion.

6. The portable carrier bag of claim 1, wherein the loop for connection with the pet leash is formed by using any one of a combination of a button accommodating portion and a button, a combination of female and male Velcro tapes, a combination of a hook and a loop, and a combination of magnets.

7. The portable carrier bag of claim 1, wherein the loop for connection with the pet leash and the loop for connection with the shoulder strap are used respectively through connection with a strap.

\* \* \* \* \*